(12) United States Patent
Spiesser et al.

(10) Patent No.: US 12,486,154 B2
(45) Date of Patent: Dec. 2, 2025

(54) CONVEYING OF A CAPPING ELEMENT

(71) Applicant: SIDEL PARTICIPATIONS, Octeville-sur-Mer (FR)

(72) Inventors: Daniel Spiesser, Reichstett (FR); Stéphane Lorange, Reichstett (FR); Emmanuel Roth, Reichstett (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 18/444,618

(22) Filed: Feb. 16, 2024

(65) Prior Publication Data
US 2024/0279041 A1 Aug. 22, 2024

(30) Foreign Application Priority Data

Feb. 16, 2023 (FR) .................................. FR2301450

(51) Int. Cl.
*B67B 3/24* (2006.01)
*B67C 7/00* (2006.01)

(52) U.S. Cl.
CPC ........ *B67B 3/24* (2013.01); *B67C 2007/0066* (2013.01)

(58) Field of Classification Search
CPC .......................... B67C 2007/0066; B67B 3/24
See application file for complete search history.

(56) References Cited

U.S. PATENT DOCUMENTS

| | | | | |
|---|---|---|---|---|
| 3,773,391 A * | 11/1973 | Crandall | ................ | B65G 51/03 406/88 |
| 5,299,889 A * | 4/1994 | Langenbeck | ........ | B65G 51/035 406/88 |
| 5,318,166 A | 6/1994 | Mojden | | |
| 5,984,591 A * | 11/1999 | Hilbish | ................. | B65G 51/03 406/88 |
| 7,513,716 B2 * | 4/2009 | Hayashi | ................ | B65G 51/03 406/87 |
| 7,850,403 B2 | 12/2010 | Lorange | | |

(Continued)

FOREIGN PATENT DOCUMENTS

| | | |
|---|---|---|
| DE | 102011086070 A1 | 5/2012 |
| EP | 1106545 A1 | 6/2001 |
| GB | 1349095 A | 3/1974 |

OTHER PUBLICATIONS

French Search Report dated Dec. 13, 2023 for FR2301450.

*Primary Examiner* — Andrew M Tecco
*Assistant Examiner* — Nicholas E Igbokwe
(74) *Attorney, Agent, or Firm* — Blake T. Hudson

(57) ABSTRACT

A device for conveying a cap-type capping elements, which are pushed aeraulically to circulate the capping elements in a forward direction. In example embodiments, the device includes firstly an elongate plenum in which a gaseous fluid circulates, and secondly a channel in which the capping elements circulate in a forward direction and that has a front face, a rear face, and two edge faces. In example embodiments, the device comprises an aeraulic circuit to convey the gaseous fluid from the plenum to the channel to push the capping elements, the rear face of said channel being arranged against the plenum and the front face thereof being at least partially closed by a back-plate of the device. In example embodiments, the back-plate may be removable.

18 Claims, 1 Drawing Sheet

(56) References Cited

U.S. PATENT DOCUMENTS

| | | | | |
|---|---|---|---|---|
| 2009/0166153 A1* | 7/2009 | Dotson | ............. | B65G 47/1471 |
| | | | | 198/493 |
| 2011/0017568 A1* | 1/2011 | Hamm | ................... | B67B 1/005 |
| | | | | 193/2 R |
| 2014/0138209 A1* | 5/2014 | Buchhauser | ......... | B65G 47/261 |
| | | | | 198/347.1 |

* cited by examiner

CONVEYING OF A CAPPING ELEMENT

CROSS-REFERENCE TO RELATED APPLICATIONS

This application claims the benefit of French Application No. FR2301450, filed Feb. 16, 2023, the entire contents of which is hereby incorporated herein by reference.

The present invention relates to the field of equipment and methods for packaging liquid on a production line. More specifically, on this type of line, which handles bottles, vials and other containers, the capping elements for said containers have to be moved, notably from a store to the capping machine.

Thus, the capping elements, which are usually caps, lids or crown caps, which are for example made of metal, are moved from equipment that has correctly oriented them from a loose zone in which the orientation of the capping elements is unknown, to a capping machine, which is sometimes built into the filling machine.

This movement is usually effected in a chute or channel with sectional dimensions adapted to those of the capping elements, creating a gauge. The capping elements are driven through such a channel, which preserves the orientation thereof, i.e. it prevents the capping element, which has been oriented with its disk-shaped bottom in a specific position, from pivoting until its bottom is on the other side. The drive may be provided by injecting a gaseous fluid, usually simply air, which may be cleaned or sterilized where usage conditions so require. In such implementations, air is injected into the circulation channel for the capping elements, this channel being nearly closed to ensure the circulation of air therein, to push the capping elements. The air is injected into the channel in a direction that moves the capping elements forwards, one after another.

Thus, for example, the publication US2009166153 is known, disclosing means for driving capping elements such as caps or crown caps. The device comprises an elongate plenum that extends along the path followed by the caps. Pumps are used to feed compressed air to this plenum. A channel is formed against the plenum using walls enabling the cap to slide against the plenum. Along the entire movement path, eyes are provided in the surface of the plenum against which the caps are circulating, so as to push the caps.

There is nonetheless a need to improve the existing implementations, in particular to make them more reliable and to use less energy. Indeed, in the existing implementations, blockages may occur as a result of the capping elements rearing up or becoming blocked in the channel.

Furthermore, moving the capping elements forwards using eyes positioned successively as is currently known requires a large energy source, since the plenum has to be fed with pressurized air continuously.

The invention achieves this objective by injecting air towards the sides of the capping elements rather than against the bottom, in a channel arranged against the plenum and to which the pressurized air is conveyed by an aeraulic circuit circulating between the plenum and the channel.

For this purpose, the invention relates to a device for conveying a cap-type capping element, in which the capping elements are pushed aeraulically, said device comprising firstly an elongate plenum in which a gaseous fluid circulates, and secondly a channel in which the capping elements circulate in a forward direction and that has a front face, a rear face, and two edge faces.

The device therefore has an elongate shape in a direction referred to as the forward direction, which is the direction in which the capping elements are moved.

As will be further described, the capping elements are overall thin disks, i.e. having a height that is less than their diameter. The capping element may be a metal cap, a plastic lid, a screw cap with a tab, etc. In some cases, the capping element is therefore a relatively flat cap, whereas in other cases the height may be greater than the diameter, as is the case with "sport" caps that have a mouthpiece for direct consumption, possibly also with a cap. The shape of the capping element enables cooperation for assembly on a bottle-type container by crimping or screwing.

The movement is effected in the device such that the capping elements are not arranged on top of one another, i.e. with their base disks globally superposed, but one after another, i.e. with their disks globally next to one another. The base disks of the capping elements, from which they have a given height, therefore extend globally in the same plane, such that the line of capping elements, when moving, has a height that is approximately the same as the height of a single capping element, perpendicular to the base disk thereof, and a length that corresponds directly to the number of capping elements arranged one after another in the line, and not a height that would result from stacking the capping elements, with the respective disks thereof arranged successively perpendicular to their plane.

The device therefore moves the capping elements along a movement that is globally parallel to the disk thereof. This movement is obtained aeraulically, i.e. a gaseous fluid circulates inside the device and, on reaching the capping elements, pushes and moves them, for example in particular when reaching the skirt or edge of the capping element.

This gaseous fluid can be filtered to prevent dust from being added to the capping elements. This may simply be ambient air pressurized by a suitable pump. Inside the device, the gaseous fluid is injected into a plenum in which it circulates. As a whole, this plenum has an elongate profile shape in the forward direction with an overall rectangular section. This plenum extends over some or all of the route to be followed by the capping elements. Naturally, since this plenum has to enable the circulation of the gaseous fluid, it is not closed, but has outlets leading to the capping elements, as described below, preferably in the front face.

The capping elements circulate in another profile, arranged globally against the plenum described above. The section of this profile, which is perpendicular to the direction in which it extends, i.e. the forward direction, like the plenum, is rectangular and dimensioned to fit the capping element being handled. In a plane perpendicular to the forward direction, the channel has a rectangular section, with a large side and a small side. On one hand, the dimension of the small side must be considerably smaller than the diameter of the capping element, and preferably just a little bigger than the dimension of the capping element perpendicular to the disk, i.e. the height thereof, whereas on the other hand, the dimension of the large side is at least equal to the largest dimension of the capping element in the plane of the disk, so that the section forms a clearance gauge for the capping elements, but holds them in position and prevents them from rotating inside the channel. A section of such dimensions ensures that the capping elements circulate with their disks one after another in the forward direction, without any chance of pivoting or changing orientation inside the channel. Indeed, with an appropriately dimensioned channel, the reduced mobility of the capping element in the channel ensures that the capping element cannot be in the channel with its diameter in the vertical direction of the channel, which therefore ensures that the capping element cannot change orientation when moving in the channel. In other words, the height of the channel essentially corresponds to the height of the capping element to enable it to circulate while preventing said capping element from pivoting about itself. This feature prevents jamming and orientation issues involving the capping elements. Furthermore, since the large dimension of the section corresponds approximately to the diameter of the capping element, i.e. its largest dimension in the plane of the disk, the capping elements are all aligned in the forward direction, i.e. the angle between the forward direction and the line between two successive capping elements is low. This prevents the flow of capping elements from being significantly wider than the width of one capping element.

As can be seen from the foregoing, both the plenum and the channel have a profile shape that extends in the forward direction and that has an overall rectangular shape. The channel extends against the plenum, i.e. the channel is arranged beyond one side of the plenum. The border between the channel and the plenum is found in a back plane, the plenum being arranged on one side of said back plane, while the channel is arranged on the other side. The forward direction is parallel to the back plane, and the section of the plenum and the section of the channel are perpendicular to the back plane. In an optimum configuration, the capping elements circulate in the device with their disk oriented parallel to the back plane. The height of the capping elements is therefore perpendicular to the back plane, which is located where the channel meets the plenum.

The channel has a rear face, which is the face oriented towards the plenum, i.e. in the back plane. The channel has a front face opposite and parallel with the rear face. The two other faces of the channel, which are parallel with one another, are two edge faces that correspond to the height of the capping element, as explained above.

The front face, the rear face and the two edge faces are parallel with the forward direction and are obtained by extending the rectangular section of the channel in this direction. Naturally, they do not form an hermetically sealed channel, since the gaseous fluid used to drive the capping elements has to be allowed to circulate.

According to the invention, the device comprises an aeraulic circuit to convey the gaseous fluid from the plenum to the channel to push the capping elements, the rear face of the channel being arranged against the plenum and the front face thereof being at least partially closed by a back-plate of the device, preferably a removable back-plate, and the aeraulic circuit opening into the channel through at least one edge face.

The device thus has an aeraulic circuit that is arranged on the same side as the channel in relation to the back plane and that conveys the gaseous fluid, i.e. air, in the plenum to the channel containing the capping elements. The channel is not completely blocked at least at the ends thereof in the forward direction, or is not blocked at the front face thereof, thereby enabling the air to flow beyond the channel, and enabling the flow to be established. The air is therefore injected into the plenum, then into the aeraulic circuit, then into the channel, then out of the channel.

A back-plate at least partially closes the front face of the channel to prevent the capping elements, also referred to as caps, from leaving the channel. The back-plate can form an outlet slot for the air injected into the channel, this slot optionally extending over the entire length of the channel.

In the device, the aeraulic circuit opens into the channel through one or both edge faces. The aeraulic circuit thus directs the air from one of the edge faces to the opposite edge face, and also in the forward direction, but does not direct the air from the rear face towards the front face, or from the front face towards the rear face. The capping element therefore receives the air delivered into the channel by the aeraulic circuit towards the side thereof, rather than towards the disk thereof.

In possible embodiments, the back-plate is removable and/or adjustable to enable adjustment of the distance between the front face and the rear face, and therefore the permissible height of the capping element, and/or adjustment of the size of the opening in the front face, for visibility and/or the air outlet.

In some embodiments of the device, it comprises at least one distributor arranged against the plenum, the aeraulic circuit being arranged in said at least one distributor. As mentioned above, the device takes the form of a plenum against which a channel is arranged, each on a respective side of a back plane, and the air is injected from the plenum into the channel via an aeraulic circuit that opens into one or more edge faces of the channel. It is therefore advantageous for the aeraulic circuit to be in a block in the corner between the edge face of the channel and the plenum. This aeraulic circuit is formed as a cavity hollowed out of the face of the distributor arranged against the plenum. The distributor redirects the air flow from its passage between the plenum and the intake in the distributor, which is globally perpendicular to the back plane, to its passage between the distributor and the channel, which is globally parallel to the back plane.

Providing the aeraulic circuit in the form of a cavity hollowed out of the surface of the distributor arranged against the plenum is particularly simple to implement, facilitates cleaning and enables good air circulation.

Thus, in possible embodiments, the aeraulic circuit formed in the at least one distributor comprises firstly a cavity for receiving the gaseous fluid from the plenum, and secondly injectors in the form of grooves that extend from said cavity and open into the channel through an edge face to inject the gaseous fluid into said channel and to push the capping elements. The cavity has an overall elongate shape extending in the forward direction, which facilitates positioning and mounting thereof against the plenum, while ensuring that the cavity opens into the air passages provided in the front wall of the plenum for air circulation. This cavity may have an overall oblong shape extending in the forward direction.

The second element of the aeraulic circuit in the distributor is a set of injectors that open into the channel, and therefore into the edge face perpendicular to the back plane. These injectors may also be hollowed out of the face of the distributor, and approximately take the form of grooves between the air intake cavity in the distributor on one hand, and an edge face of the channel on the other hand. These injectors may be parallel with one another.

According to a possible additional feature, the injectors are oblique in relation to the edge face in which they open, so that the flow that they create has a component in the forward direction to move the capping elements. Thus, rather than being oriented exclusively from an edge face towards the opposite edge face, and therefore perpendicular to the forward direction, the injector is such that the orientation thereof has a component extending in the forward direction.

The air flow created when it opens into the channel via the edge face does not thus only comprise a component perpendicular to said edge face towards the opposite edge face, but also a component extending in the forward direction. This promotes the movement of all the capping elements in the same direction in the channel. Conversely, if the air flow were injected by the injector directly towards the opposite edge face, there would be a risk of capping element tending to move in the wrong direction, thereby reducing the speed of the single line of caps.

According to a possible additional feature, the at least one distributor is removably fastened to the plenum, for example by screwing. This provides the option, which may be temporary, of using distributors that generate a reduced air flow to a given location, and a greater air flow to another location, for example as a function of the shape of the path. According to the invention, the device may have several distributors arranged one after another along the path, and these distributors may be identical or different.

As described below, the device may be a stack comprising a distributor fastened between a plate at the joint between the plenum and the channel on one side, and the back-plate on the other side.

According to a possible additional feature of the device, it comprises two distributors, each at an edge face, the aeraulic circuit extending into each of the two distributors so that the gaseous fluid reaches the two edge faces of the channel, preferably symmetrically. The device thus has two distributors, each arranged at an edge face of the channel. The distributors preferably face one another, i.e. the injectors arranged on one of them face the injectors arranged on the other, in relation to the forward direction.

The aeraulic circuit in the device is in this case formed on both of the distributors, i.e. the air circulates from the plenum to the channel via one of the distributors on one path and the other distributor on another path. The aeraulic circuit that conveys the air from the plenum to the channel therefore extends over both distributors. Such an arrangement is possible with more than two distributors, for example distributors arranged successively in the forward direction, with at least one other distributor opposite. Such a combination for example enables an aeraulic circuit that passes through a single distributor, and that therefore opens into a single edge face, for a portion of the path, then, for a portion requiring more thrust, for example an upward slope, that passes through two distributors, and that therefore opens into the two edge faces of the channel.

According to another possible additional feature of the device, it comprises a front wall delimiting the plenum on the side of the channel and having at least one orifice enabling the gaseous fluid to circulate from the plenum into the aeraulic circuit, said at least one orifice notably being opposite the cavity of the aeraulic circuit, where applicable. The at least one distributor is for example mounted on the front wall, where applicable.

According to another possible additional feature, the at least one back-plate is removably mounted, notably on the distributor or one of the distributors. This provides a single removable back-plate that is fastened removably to one of the distributors and that covers a part of the channel towards the other distributor, without however reaching it, so as to form a window for the passage of air. The back-plate must not allow the capping elements to be expelled, and must also enable visual inspection and/or air discharge, which facilitates the circulation thereof. This can be achieved by not completely closing the space between the two distributors parallel to the back plane, for example with a plate fastened to one distributor, but that does not reach the other, two plates, each fastened to one of the two distributors that face one another, but mounted with a gap between them, or one or more plates that are not completely closed, but that have orifices, openings, eyes, passages, windows, or the like.

Thus, in certain embodiments of the device, it has two plates on the front face, arranged in line with one another, and any gap between them creates a slot in the front face of the channel, for example to enable the gaseous fluid to be discharged from said channel.

The invention also relates to a method for implementing such a device, specifically a method for aeraulically moving cap-like capping elements in an elongate channel that is as a whole rectilinear in a forward direction and of rectangular section, and that has a front face, a rear face, and two edge faces, the capping element having a disk that circulates against the front face or against the rear face, in which method a gaseous fluid is injected into the channel to push the capping elements therein, and to move them in the forward direction.

The caps preferably circulate with the disk against the rear face, as a result of prior orientation using orientation equipment. Naturally, the inverse orientation may be used without adversely affecting the system, all the capping elements still being oriented in the same way in the channel where they are circulating one after another.

According to the method, the capping elements are pushed one after another, and each one is pushed by the preceding one and by the air flow circulating in the channel. The circulation is at least partially linear, in that movement follows a straight line, i.e. the forward direction, along at least a part of the path.

According to the invention, the gaseous fluid is injected into the channel from at least one of the edge faces. In other words, when it enters the channel, the air circulates overall parallel to the disk of the capping element. It then acts on the cap by pushing on the edge face, or edge, of the capping element, either from the outside or from the inside. By being discharged through an edge face, the injected air enters the channel approximately parallel to the front face and/or the rear face, and then circulates therebetween. The air is preferably not injected towards one of these two faces, the air being injected from an edge face or both edge faces between each of the two faces. Naturally, the air flow may be slightly inclined towards one or the other of the faces, without this being as intense as if the flow is injected from one of the two faces and expelled towards the other.

According to a possible additional feature, the gaseous fluid is injected into the channel with an orientation having a component extending in the forward direction. Thus, instead of injecting all of the air flow from an edge face towards the other edge face, which would create an air flow globally perpendicular to the edge face extending in the forward direction, it is preferably for the movement of the flow injected into the channel to have a component extending in the forward direction, i.e. along the axis of the channel. Thus, the cap is not simply pushed against the opposite edge face, but is effectively pushed in the channel in the forward direction.

According to another possible additional feature, the gaseous fluid is injected into the channel symmetrically, each time from one of the edge faces to the other and partially in the forward direction. In this case, the gaseous fluid, which may be air or something else, is injected from each of the edge faces, and therefore in two flows that are partially oriented towards one another. Since each of the flows has a component extending in the forward direction, and in the same sense, the pushing force exerted on the capping element is doubled. Furthermore, since the forward movement of each of the two flows towards the opposite edge face is opposed by the flow coming from said opposing edge face, the flow is diverted more in the forward direction, which further significantly increases the pushing force exerted on the capping elements in the forward direction.

BRIEF DESCRIPTION OF THE FIGURES

The invention will be understood better from the description below which is based on possible embodiments, explained illustratively and in a non-limiting manner, with reference to the attached figures, in which.

DETAILED DESCRIPTION

Figure 1:
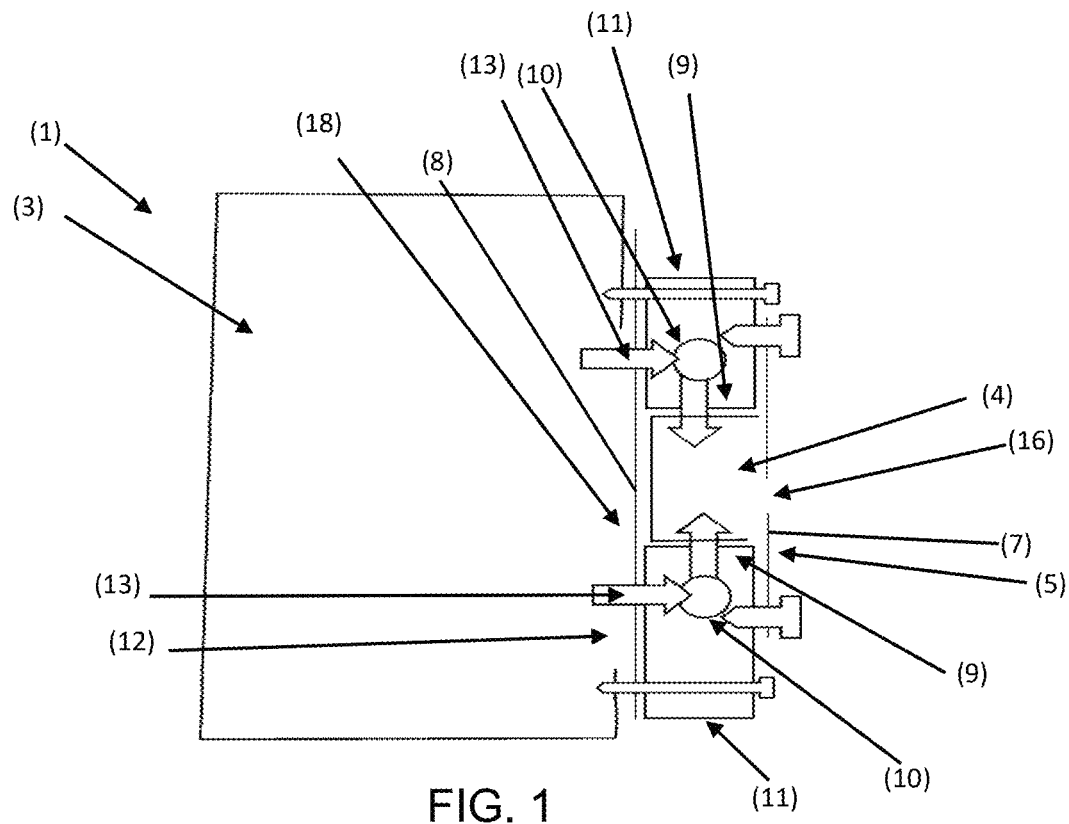
FIG. 1 is a schematic view of a device according to the invention.

In the remainder of the description, elements that have the same structure or similar functions denoted using the same reference signs.

Thus, this invention can more specifically be implemented in the following manner.

The device 1 is therefore used to move caps 2, which may be made of plastic or of metal. Generally, the cap 2 has a circular disk 17 and an edge that extends from this disk. This edge can be overall perpendicular to the disk 17, as is the case with a simple plastic cap, or may be slightly flared, as is sometimes the case with metal crown caps before they are crimped onto the neck of a bottle. The capping element 2 therefore has a diameter that corresponds overall to the diameter of the disk 17, with any flaring not adding very much. The capping element, or cap 2 also has a height, which is its dimension in the direction perpendicular to the plane containing the disk 17, this direction being the direction of its axis of symmetry.

In such a device 1, the caps 2 are moved one after the other, i.e. in a line that is the width of a single cap 2. Their relative position is such that the disks 17 are in the same plane, and the movement is made in a direction parallel to this plane, and therefore parallel to the radii of the circle formed by the disk 17. The capping elements 2 are thus conveyed flat and in a line, which for example helps to prevent two caps 2 from getting caught together.

The caps 2 are moved by an air flow, in the manner described below.

The device 1 comprises a plenum 3 that is overall a elongate channel extending in a given direction, which becomes the forward direction 6. The plenum 3 therefore has a section that extends in this direction so as to create a hollow volume into which pressurized air can be injected. The section of the plenum 3 is rectangular overall, and the caps 2 are moved with their disk 17 parallel to the line of an edge of said rectangle, in the forward direction. This plenum 3 is open so as to create a circulation of air that helps to push the capping elements 2, as described below. The pressurized air injected into the plenum 3 comes out of said plenum through openings created to convey the air against the capping elements 2 and to push them in their dedicated circulation channel 4.

Indeed, the device 1 also has a channel 4, which also has an overall rectangular section extending in the forward direction 6, and this channel enables the caps 2 to be contained during the movement created by the circulation of the air initially injected into the plenum 3.

Essentially, the channel 4 is arranged against the plenum 3. The overall linear profiles of rectangular section they form are arranged against one another. As further described below, a single plate forms a wall of the plenum 3 and a wall of the channel 4. Since the channel 4 has a section smaller than the plenum 3, its profile does not cover the whole of the profile of the plenum 3.

The section of the channel 4 is adapted to the type of cap 2 being handled, and more specifically to the dimensions thereof. Indeed and as mentioned above, the capping element 2 is conveyed with its disk 17 parallel to the forward direction 6, which is the direction in which both the plenum 3 and the channel 4 extend. The section of the channel 4 is rectangular overall, with two edges with dimensions corresponding to the diameter of the disk 17, or slightly larger in the case of a flared cap 2, or at least to avoid jamming, and with two other edges with dimensions corresponding to the height of the cap 2.

The device 1 has a back plane 18 parallel to the forward direction 6. The plenum 3 is arranged on one side of this back plane 18 and the channel 4 is arranged on the other side. In other words, the channel 4 rests against the plenum 3 and their shared side is located at the back plane 18.

Preferably, the channel 4 is such that the disk 17 of the cap 2 circulating therein is parallel to the back plane 18. Thus, the large dimension of the section of the channel 4, which corresponds approximately to the diameter of the disk 17 of the capping element to be conveyed, is parallel to the back plane 18, and the small dimension of the section of the channel 4 is perpendicular to the back plane 18.

In the back plane 18, the device 1 has a flat plate or front plate 12, which may be removable, that contributes to defining the plenum 3 on one side and the channel 4 on the other side. As described below, this front plate 12, which thus also forms the rear face 8 of the channel 4, has at least one orifice 13 to discharge the air from the plenum 3 and to convey it against the caps 2, and more specifically against the edges of the caps 2.

A detail of the invention is that the blown air injected into the plenum 3 enters the channel 4 via the smaller edges of the section thereof, i.e. the edges designed to accommodate the height of the cap 2.

More specifically, the device 1 comprises at least one distributor 11 to convey the air flow into the channel 4 via the small side.

The distributor 11, preferably in the form of a block also extending in the forward direction 6, may be arranged against the front plate 12. The distributor 11 rests against the front plate 12 with one of its sides, and another of its sides forms an edge of the section of the channel 4. The distributor 11 is provided with an aeraulic circuit 10 to direct the air received from the plenum 3 into the channel 4. Indeed, the distributor 11 covers the orifice 13 in the front wall 12 of the plenum, i.e. it is fastened on the at least one orifice 13 in the front plate 10 of the plenum 3.

The orifice 13 in the front plate 10 takes the form of an elongate hole extending in the forward direction 6, or several such oblong holes.

The distributor 11 has a cavity 14 in its face arranged against the plenum 3. The distributor 11 is positioned such that this cavity 14, which is part of the aeraulic circuit 10, at least partially reaches the orifice 13 provided in the front wall 12 of the plenum 3 or one of them, so as to enable the air flow created in the plenum 3 to be discharged from the plenum 3 through the orifice 13 into the aeraulic circuit 10, and more specifically the cavity 14 in the distributor 11.

The distributor 11 has a front and a back that are parallel to the back plane 18, the back resting against the front wall 12 of the plenum 3. The cavity 14 is therefore provided in the back of the distributor 11. The aeraulic circuit 10 also has, downstream of the cavity 14, injectors 15 for conveying the air flow from the cavity 14 into the channel 4, to blow on the sides of the capping elements, as mentioned above. Similarly to the cavity 14, these injectors 15 are preferably arranged in the back of the distributor 11. In a simple embodiment, the aeraulic circuit 10 is therefore simply hollowed out of the back of the distributor 11, i.e. the cavity 14 and the injectors 15 following it open into the back of the distributor 11, which for example enables access following disassembly of the distributor 11 to clean the aeraulic circuit, which is fully accessible from the back of the distributor 11.

It is advantageous for the distributor 11 to be a removable part, enabling the at least partial disassembly of the device. Indeed, since the thickness of the distributor 11 at least partially determines the maximum permissible height of the capping elements, and therefore their dimension perpendicular to their disk, since the distributor 11 carries the edge face 9 extending in the forward direction 6 and thus contributes to defining an edge of the channel 4, its optionally removable nature enables a distributor 11 corresponding to the capping element circulating in the channel 4 to be used. If the cap is tall, a thick distributor 11 should be used, and vice versa. It is in fact more pertinent to use a distributor 11 having a thickness similar to the height of the capping element to be handled, and therefore to provide such a channel 4, to prevent excessive unwanted energy-consuming movements of the capping element in the channel 4 between the rear face 8 and the front face 7, potentially incessant partial rotations or vibrations.

Figure 2:
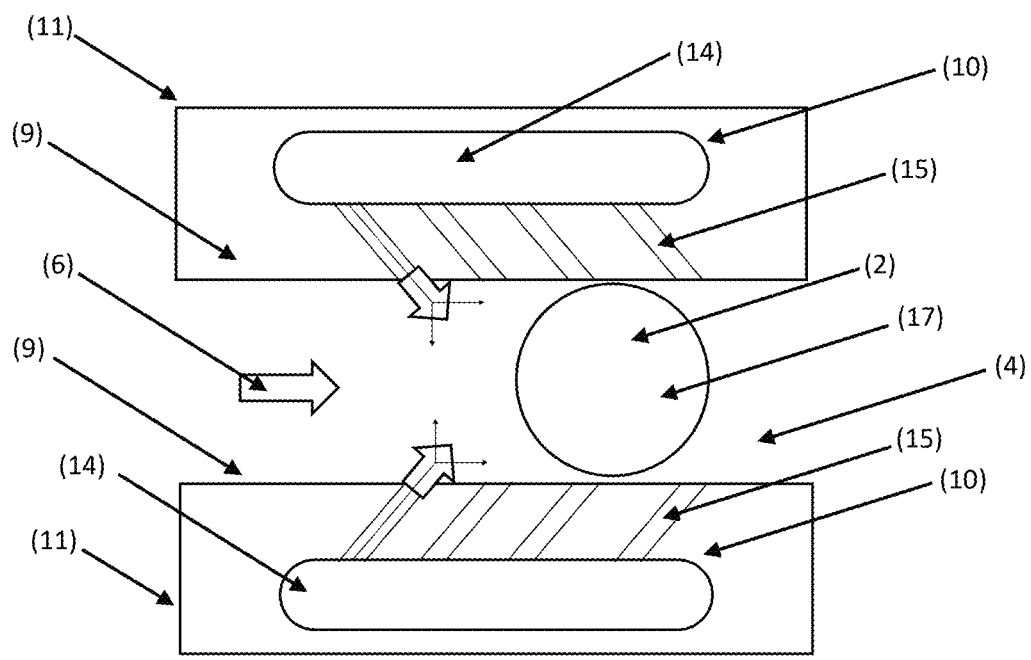
FIG. 2 shows in particular the distributors arranged on the plenum.

As shown in FIG. 2, the injectors 15 are linear grooves in the back of the distributor 11. These grooves open at one end into the cavity 14 and at the other end into the face of the distributor 11 that contributes to defining the channel 4, along the short length of its section.

The air blown into the plenum 3 is therefore discharged therefrom through the at least one orifice 13 in the front wall 12, enters the cavity 14 of the aeraulic circuit 10, then continues through the injectors 15 into the channel 4. The air is injected into the channel 4 substantially parallel to the back plane 18. In other words, the air enters the channel 4 from the distributor 11, which defines at least one of the sides thereof perpendicular to the back plane 18, then enters the channel 4 from one of these sides. By virtue of this arrangement, the air enters the channel 4 not from one of its faces parallel to the disk 17 of the cap 2 and therefore to the back plane 18, but from at least one of the two other faces thereof, which are perpendicular thereto. Furthermore, it is advantageous for the injectors 15 to inject the air into the channel 4 not perpendicularly to the surface in which they open. Indeed, an air flow perpendicular to the edge of the channel 4 would press the cap 2 against the opposite side, with little assurance of moving the cap in the forward direction 6 and in the desired direction. Preferably, the injectors 15 are therefore oriented with a component in the forward direction 6, so that the air flow they provide creates a force on the cap 2 in the forward direction 6. In other words, the grooves that form the injectors 15 are therefore at an angle, and extend with a component in the forward direction 6 from the cavity 14 to the face of the distributor 11, which contributes to defining the channel 4, in the desired direction of movement of the caps 2.

In some advantageous embodiments, the device 1 has two distributors 11 that face one another, each one defining one of the sides of the channel 4, which are perpendicular to the front wall 12 and therefore to the back plane 18. It is therefore possible for the injectors 15 of the two distributors 11 to be oblique, i.e. symmetrical in relation to the channel 4. The angle may be between 20° and 70°, preferably between 35° and 55°.

To facilitate the circulation of air in the channel 4, and consequently the movement of the caps 2, the front face 7 of the channel 4 is not entirely closed. For this reason, the device 1 has at least one back-plate 5 arranged parallel to the back plane 18. This back-plate 5 covers only a part of the space between the two edges of the channel 4, these edges being preferably carried by the distributors 11, as described above. Preferably, this back-plate 5 is fastened but its position can be adjusted to adjust the gap left open in the front face 7 of the channel 4. In advantageous embodiments, the device 1 has two such back-plates 5, and at least one of them can be moved towards the other to easily adjust the slot 16 between them.

It is clear from the foregoing that the device is an assembly comprising a back-plate 5 mounted on a distributor 11, which is itself mounted on the front wall 12 of the plenum 3, which is itself for example mounted on a U- or C-shaped profile to close it, thus forming said plenum 3.

In some of the embodiments mentioned, the aeraulic circuit 10 opens in the surface of the distributor 11, and more specifically in the surface lying in the back plane 18. In other embodiments, the aeraulic circuit 10 in the distributor is remote from the two surfaces of the distributor 11, one bearing against the plenum 3 and the other being remotely parallel thereto. In other words, the aeraulic circuit 10 circulates at least partially inside the distributor and not on the surface thereof. This is notably the case for the injectors 15, the cavity 14 feeding them optionally being hollowed out of the surface of the distributor 11, and therefore accessible therefrom. The injectors 15 then open into the edge face 9 and not in the front face 7 or the rear face 8 of the channel, but open into the channel 4 via the edge face 9, between these two faces. The air flow thus obtained is injected against the capping elements not from the corner formed between an edge face 9 and the rear face 8, but from a zone of the edge face 9 that is remote both from the front face 7, extending one of the front surfaces of the distributor 11, and from the rear face 8, extending the other front surface of said distributor 11. This notably prevents the air flow, when discharged from a nozzle of the injectors 15 at the corner of the edge face and the front face, from pushing the capping element towards the rear face, or conversely from the rear face towards the front face, which increases friction. When the air is injected from a zone remote from the front and rear faces of the channel, some friction is avoided. This has the notable advantage of reducing the energy required to move the caps, notably by limiting friction, jamming, or misorientation of the caps.

Although the invention has been described with reference to specific embodiments, some or all of the component features thereof may be freely combined to form other embodiments.

The invention claimed is:

1. A device for conveying a cap-type capping element, in which the capping elements are pushed aeraulically, said device comprising firstly an elongate plenum in which a gaseous fluid circulates, and secondly a channel in which the capping elements circulate in a forward direction and that has a front face, a rear face, and two edge faces, at least one of the two edge faces disposed below the capping elements being conveyed along the channel and the other of the two edge faces disposed above the capping elements being conveyed along the channel, wherein the device comprises an aeraulic circuit to convey the gaseous fluid from the plenum to the channel to push the capping elements, the rear face of said channel being arranged against the plenum and the front face thereof being at least partially closed by a back-plate of the device, the aeraulic circuit opening into the channel through at least one edge face.

2. The device according to claim 1, further comprising at least one distributor arranged against the plenum, the aeraulic circuit being arranged in said at least one distributor.

3. The device according to claim 2, wherein the aeraulic circuit formed in the at least one distributor comprises firstly a cavity for receiving the gaseous fluid from the plenum, and secondly injectors in the form of grooves that extend from said cavity and open into the channel through at least one edge face to inject the gaseous fluid into said channel and to push the capping elements.

4. The device according to claim 3, wherein the injectors are oblique in relation to the edge face in which they open, so that the flow that they create has a component in the forward direction to move the capping elements.

5. The device according to claim 2, therein the at least one distributor is removably fastened to the plenum.

6. The device according to claim 2, wherein it comprises two distributors, each at an edge face, the aeraulic circuit extending into each of the two distributors so that the gaseous fluid reaches the two edge faces of the channel, preferably symmetrically.

7. The device according to claim 2, further comprising a front wall delimiting the plenum on the side of the channel and having at least one orifice enabling the gaseous fluid to circulate from the plenum into the aeraulic circuit.

8. The device according to claim 2, wherein the at least one back-plate is removably mounted to the at least one distributor.

9. The device according to claim 8, wherein the at least one plate is adjustably mounted, notably to adjust the width of a slot in the front face.

10. The device according to claim 2, wherein the device comprises two back-plates on the front face arranged in line with one another.

11. A distributor for the device according to claim 1, the distributor configured to convey air flow into the channel of the device.

12. A method for aeraulically moving cap-like capping elements in an elongate channel that is as a whole rectilinear in a forward direction and of rectangular section, and that has a front face, a rear face, and two edge faces, at least one of the two edge faces disposed below the capping elements moving along the channel and the other of the two edge faces disposed above the capping elements moving along the channel, the capping element having a disk that circulates against the front face or against the rear face, in which method a gaseous fluid is injected into the channel to push the capping elements therein, and to move them in a forward direction, wherein the gaseous fluid is injected into the channel from at least one of the edge faces.

13. The method according to claim 12, wherein the gaseous fluid is injected into the channel from each of the two edge faces facing one another.

14. The method according to claim 13, wherein the gaseous fluid is injected into the channel symmetrically, each time from one of the edge faces to the other and partially in the forward direction.

15. The method according to claim 13, wherein the gaseous fluid is injected into the channel at an orientation such that a component thereof extends in the forward direction.

16. The method according to claim 12, wherein the gaseous fluid is injected into the channel at an orientation such that a component thereof extends in the forward direction.

17. The method according to claim 16, wherein the gaseous fluid is injected into the channel symmetrically, each time from one of the edge faces to the other and partially in the forward direction.

18. A device for conveying a cap-type capping element, in which the capping elements are pushed aeraulically, said device comprising firstly an elongate plenum in which a gaseous fluid circulates, and secondly a channel in which the capping elements circulate in a forward direction and that has a front face, a rear face, and two edge faces, wherein the device comprises an aeraulic circuit to convey the gaseous fluid from the plenum to the channel to push the capping elements, the rear face of said channel being arranged against the plenum and the front face thereof being at least partially closed by a back-plate of the device, the aeraulic circuit opening into the channel through at least one edge face, and wherein the capping elements within the channel remain contained therein without projecting external the channel beyond the back-plate.

\* \* \* \* \*